United States Patent [19]

Mori et al.

[11] Patent Number: 5,297,222
[45] Date of Patent: Mar. 22, 1994

[54] IMAGE PROCESSING APPARATUS

[75] Inventors: Kinji Mori, Yokohama; Yoko Kunai; Shoji Miyamoto, both of Kawasaki; Sadanori Shingai, Yokohama; Hirokazu Ihara, Machida, all of Japan

[73] Assignee: Hitachi, Ltd., Tokyo, Japan

[21] Appl. No.: 785,221

[22] Filed: Oct. 28, 1991

Related U.S. Application Data

[63] Continuation of Ser. No. 262,179, Oct. 26, 1988, abandoned, which is a continuation of Ser. No. 28,468, Mar. 20, 1987, abandoned, which is a continuation of Ser. No. 634,558, Jul. 26, 1984, abandoned.

[30] Foreign Application Priority Data

May 4, 1982 [JP] Japan .............................. 57-75644
May 21, 1982 [JP] Japan .............................. 57-84792

[51] Int. Cl.⁵ .............................................. G06K 9/00
[52] U.S. Cl. ........................................ 382/62; 382/14; 382/27; 382/65
[58] Field of Search ................... 382/62, 65, 8, 10, 14, 382/41, 27, 37, 18, 58; 358/106, 107, 163; 250/563, 223 B; H04N 7/19

[56] References Cited

U.S. PATENT DOCUMENTS

| | | | |
|---|---|---|---|
| 3,597,731 | 8/1971 | Reitboeck et al. | 382/27 |
| 3,701,095 | 10/1972 | Yamaguchi et al. | 382/49 |
| 3,876,981 | 4/1975 | Welch | 382/62 |
| 3,906,446 | 9/1975 | Iijima et al. | 382/27 |
| 3,936,800 | 2/1976 | Ejiri et al. | 382/18 |
| 3,949,363 | 4/1976 | Holm | 382/62 |
| 3,950,733 | 4/1976 | Cooper et al. | 382/15 |
| 3,967,242 | 6/1976 | Isoo et al. | 382/8 |
| 4,148,062 | 4/1979 | Kamin | 382/62 |
| 4,148,065 | 4/1979 | Nakagawa et al. | 382/8 |
| 4,153,946 | 5/1979 | Upton | 382/14 |
| 4,251,799 | 2/1981 | Jih | 382/18 |
| 4,301,443 | 11/1981 | Sternberg et al. | 382/27 |
| 4,363,104 | 12/1982 | Nussmeier | 382/41 |
| 4,369,430 | 1/1983 | Sternberg | 382/27 |
| 4,377,820 | 3/1983 | Reitmeier | 358/163 |
| 4,402,088 | 8/1983 | McWaters et al. | 382/63 |
| 4,410,278 | 10/1983 | Makihiru et al. | 250/563 |
| 4,437,160 | 3/1984 | Blum | 382/41 |
| 4,473,845 | 9/1984 | Davy | 358/163 |
| 4,480,919 | 11/1984 | Asano et al. | 250/563 |
| 4,484,349 | 11/1984 | McCubbrey | 382/27 |
| 4,486,775 | 12/1984 | Catlow | 358/106 |
| 4,490,851 | 12/1984 | Gerhart et al. | 382/18 |
| 4,500,202 | 2/1985 | Smyth | 382/8 |
| 4,524,390 | 6/1985 | Lemke | 358/163 |
| 4,550,437 | 10/1985 | Kobayashi et al. | 382/27 |
| 4,589,140 | 5/1986 | Bishop et al. | 382/14 |
| 4,589,142 | 5/1986 | Bednon | 382/37 |
| 4,590,520 | 5/1986 | Frame et al. | 358/163 |
| 4,599,692 | 7/1986 | Tan et al. | 382/15 |
| 4,614,430 | 9/1986 | Hara et al. | 382/8 |

Primary Examiner—Joseph Mancuso
Attorney, Agent, or Firm—Antonelli, Terry, Stout & Kraus

[57] ABSTRACT

In order to recognize an object to be recognized, the present invention comprises a plurality of photosensors for receiving reflected rays from an object to be recognized, and a plurality of image recognition processors. Said plurality of sensors and processors are connected in network structure, so that each of said plurality of sensors recognizes only a part of the object to be recognized and applies signals to said plurality of image recognition processors, and each of said plurality of image recognition processors recognizes the object to be recognized according only to said image recognition signals applied from said plurality of sensors adjacent to each other. Further, in order to make the image of the object, each of said image recognition processor recognizes the image of the object, in conjunction with adjacent image recognition processors, according to the information showing the profile of each part of the object, and applies signals to light emitting devices for displaying the image.

27 Claims, 17 Drawing Sheets

FIG. 13
(A)
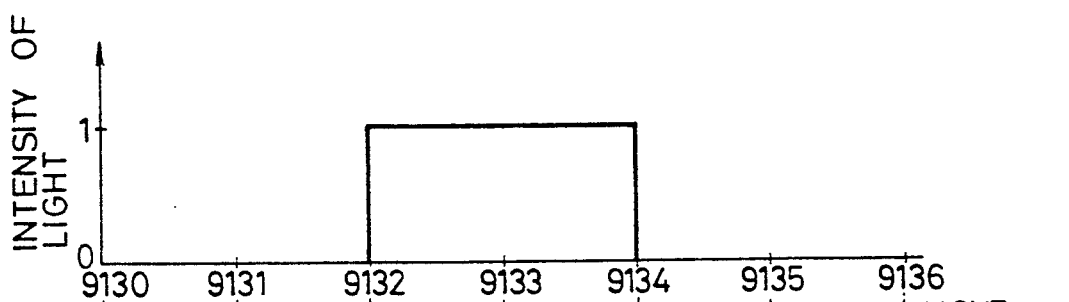
(B)
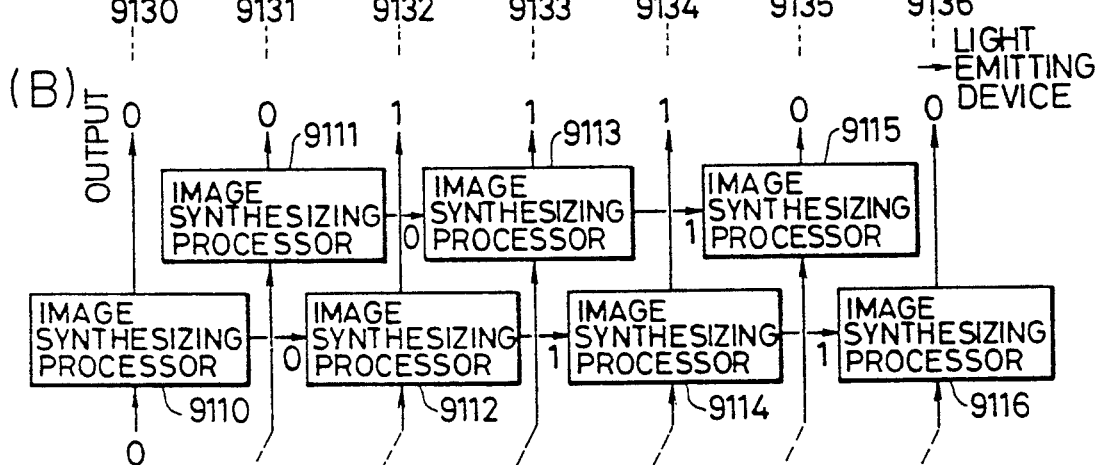
(C)
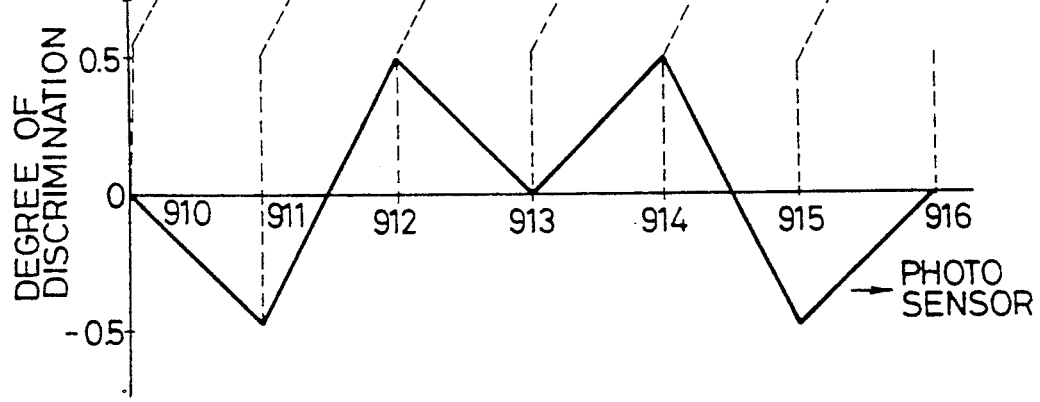

IMAGE PROCESSING APPARATUS

This application is a continuation application of Ser. No. 262,179, filed Oct. 26, 1988, which is a continuation of U.S. Ser. No. 028,468, filed Mar. 20, 1987, which is a continuation of U.S. Ser. No. 634,558, filed Jul. 26, 1984, now abandoned.

BACKGROUND OF THE INVENTION

1. Field of the Invention

The present invention relates to an image processing apparatus. In particular, relates to such an apparatus with high reliability in which a plurality of sensors and a plurality of processors are connected in a network so as to recognize an object, and to apply data on the profile of the object to a plurality of light emitting devices and to a plurality of processors to generate and output the image of the object.

2. Description of the Prior Art

Generally, conventional object recognition apparatus recognize an object by scanning an object to be recognized utilizing photo-sensors or the like, applying all data detected to one computer, and performing software processing on the data to recognize the object on the basis of correlations between the data.

This kind of conventional object recognition apparatus, however, has many disadvantages. First of all, it requires a large computer with large capacity storage and high processing speed to process the data. Second, it also requires, in case of the failure of the photo-sensors, a complicated algorithm to detect mulfunctions points and change the recognition method. Finally, the recognition of an object is completely impossible when the computer itself malfunctions.

Further in the prior art, an image that is recognized is synthesized by two methods. In a first method, a visual image is made by one computer or a plurality of computers connected in parallel, and light emitting devices scan over the display under the control of a CPU (Central Processing Unit) to generate the effects of light and darkness. On the other hand in a second method, light emitting devices are located on the display, and data, which indicates the degree of light intensity relating to the image on the whole display, are applied to each light emitting device under the control of a CPU.

These methods also have disadvantages. In the first method, the simultaneous display of the image is impossible, and further the partial modification of the image is also impossible, as the light emitting devices scan over the display. In the second method, as data indicating the degree of light intensity relating to each part of the object to be displayed are applied to each light emitting device relating to the part, even when only one of the data does not reach the device normally, this image synthesizing processor can not interpolate it and can not make the visual image of the object.

Further, as both methods apply data which indicate the degree of light intensity of the whole image to the light emitting devices, the amount of data is massive, and this causes the slowdown in the processing rate. Still further, in these methods, as both synthesis and display of the image are controlled by a CPU, both synthesis and display of the image are impossible when the CPU malfunctions.

SUMMARY OF THE INVENTION

It is, therefore, the first object of the present invention to overcome the above disadvantages and limitations of the prior object recognition apparatus, and to provide an image processing apparatus which can recognize an object at high speed by utilizing a simple algorithm, and can function with failures occurring in some of the sensors.

It is the second object of the present invention to provide an image processing apparatus in which a plurality of light emitting devices are connected to a plurality of processors with each other, respectively, to generate and display an image simultaneously in parallel by each processors according only to the profile information of the object utilizing a simple algorithm, and which can function with the partial failure of the processors and/or the partial absence of the profile information without halting the system, and further has the capability of compensating for the partial absence of the profile information.

In order to attain the first object, the present invention incorporates a plurality of processors in an object recognition apparatus having a plurality of sensors, and connects the sensors with the processors in the network structure, thereby each sensor respectively recognizes only a part of the object to be recognized and applies a signal to each processor, and each processor respectively recognizes the motion of the object to be recognized according only to said recognition signals applied from a plurality of said sensors adjacent to each other.

Further in order to attain the above second object, each processor of the present image processing apparatus generates the image of the object and applies a signal to each light emitting device in conjunction with processors adjacent to each other, so as to make the visual image of the object and display it. Further, each processor of the present apparatus is connected in a network, generates the image according only to the interchange of information between adjoining processors, and compensate the failure of the adjoining processor with each other.

BRIEF DESCRIPTION OF THE DRAWINGS

The foregoing and other objects, features, and attendant advantages of the present invention will be understood with reference to the following description and accompanying drawings wherein.

DETAILED DESCRIPTION OF THE PREFERRED EMBODIMENTS

Figure 1:
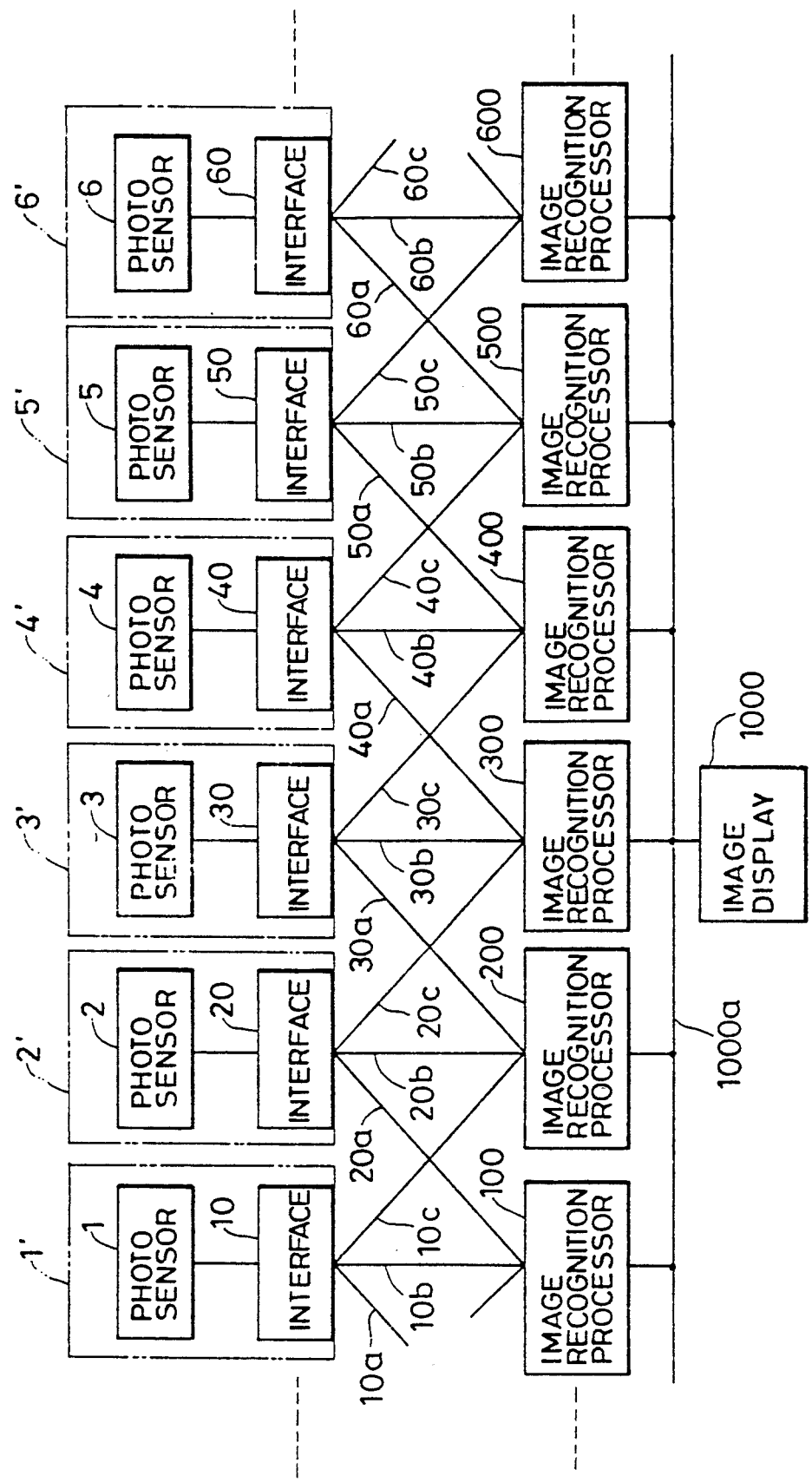
FIGS. 1 and 2 are block diagrams showing one embodiment of an object recognition apparatus according to the present invention.

FIG. 1 is a block diagram showing one embodiment of an object recognition apparatus with photo-sensors according to the present invention. In the figure, the reference numerals 1 through 6 are photo-sensors; 10 through 60 are interfaces; 100 through 600 are image recognition processors; 10a, 10b, 10c, 20a, 20b, 20c, and etc. are bus transmission lines; 1000 is an image display; and 1000a is a bus transmission line. The numerals 1' through 6' are called photo-sensor units which are combinations of the photo-sensors 1 through 6 and the interfaces 10 through 60, respectively.

The photo-sensor units 1' through 6' are connected to the image recognition processors 100 through 600 (these are called "Image Recognition Processors of the Level 1), respectively, in the network structure through the bus transmission lines 10a, 10b, 10c, 20a, 20b, 20c, and so on. The image recognition processors 100 through 600 of the level 1 apply the results of the processing to the image display 1000 through the bus transmission line 1000a.

Figure 2:
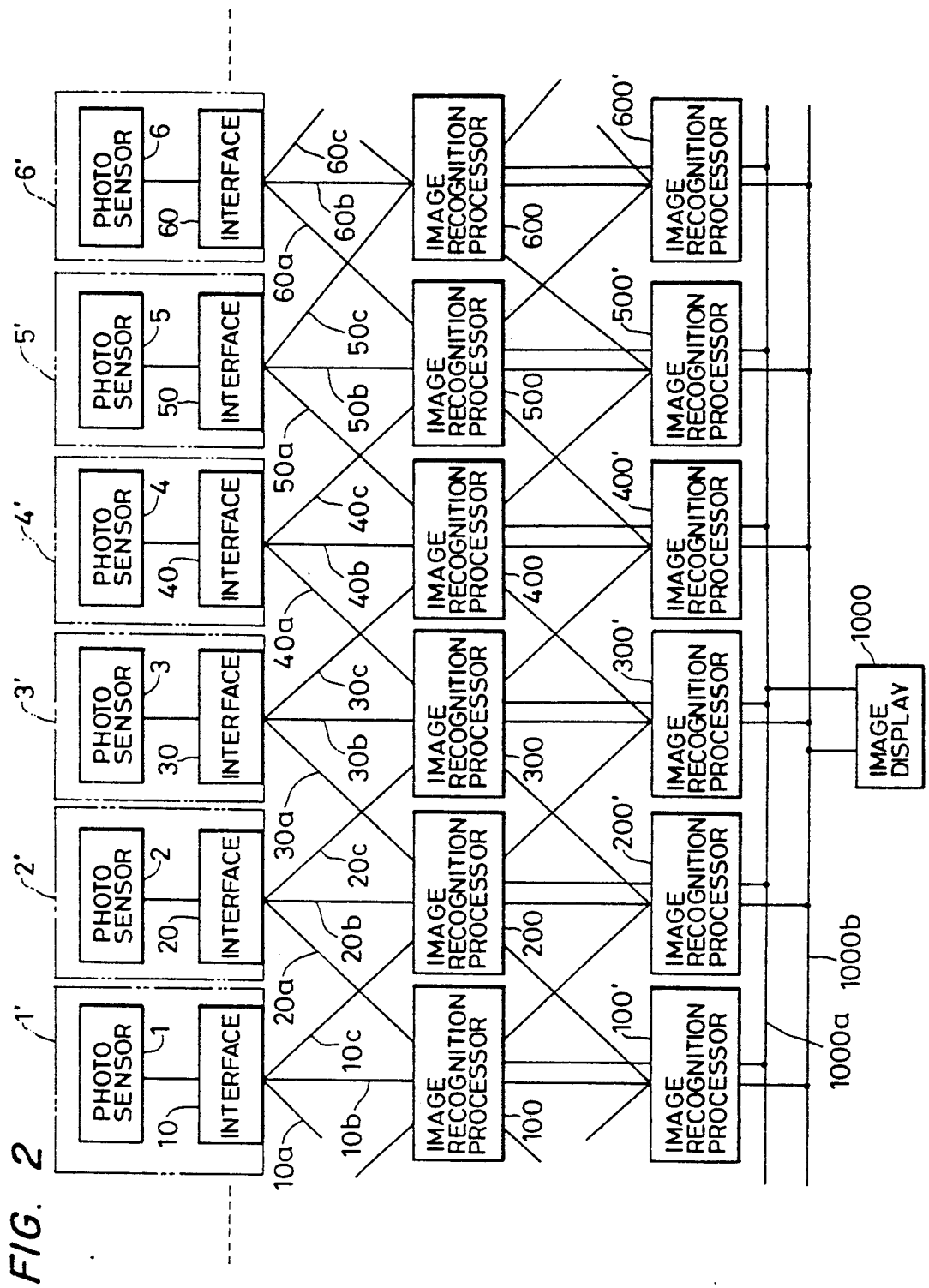

FIG. 2 shows one example of an object recognition apparatus with improved reliability in which the function of the apparatus of FIG. 1 is extended to realize the different recognition methods in the figure. The reference numerals 1 through 6; 1' through 6'; 10 through 60; 100 through 600; 1000; 10a, 10b, 10c, 20a, 20b, 20c, and so on; and 1000a identify the same components as those in FIG. 1. The numerals 100' through 600' are image recognition processors corresponding to the level 2 which is on the lower level than the image recognition processors 100 through 600.

Figure 3:
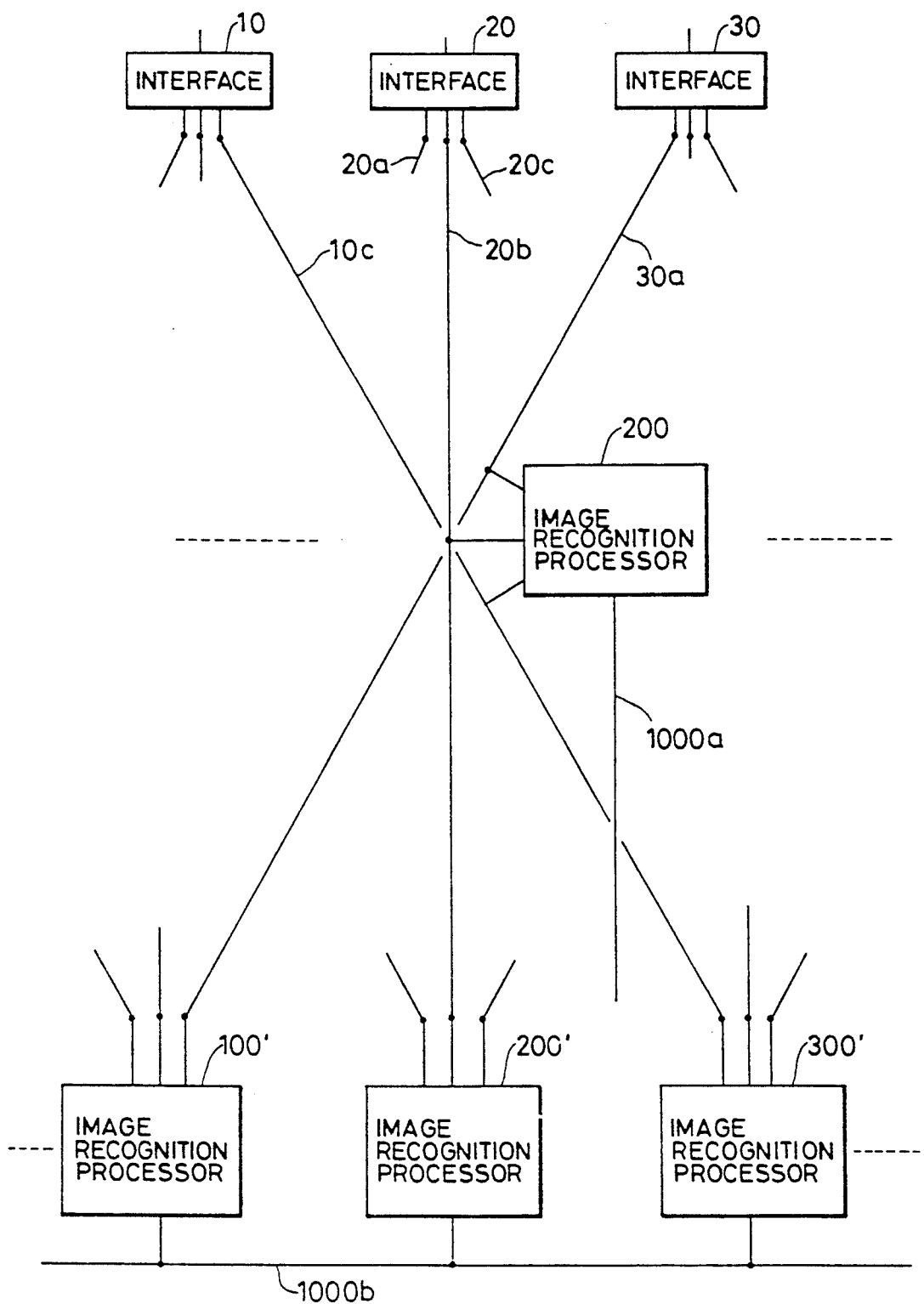
FIG. 3 is a partial enlarged view showing the connection of FIG. 2.

FIG. 3 shows the connection between the interfaces 10 through 30 of the photo-sensor units 1' through 3' and the image recognition processors 200 of the level 1 and the image recognition processors 100' through 300' of the level 2. The interfaces 10, 20, and 30 are connected to the image recognition processor 200, and further to the image recognition processors 300', 200' and 100' of the level 2 through the bus transmission lines 10c, 20b, and 30a. Thus, a recognition signal detected by the photo-sensor unit 2' is simultaneously applied to the image recognition processor 200 of the level 1 and the image recognition processor 200' of the level 2 through the interface 20 and the bus transmission line 20b. The image recognition processor 200 of the level 1 recognizes the object according to the recognition signals applied from the photo-sensor units 1', 2', and 3' in the three directions.

Figure 4:
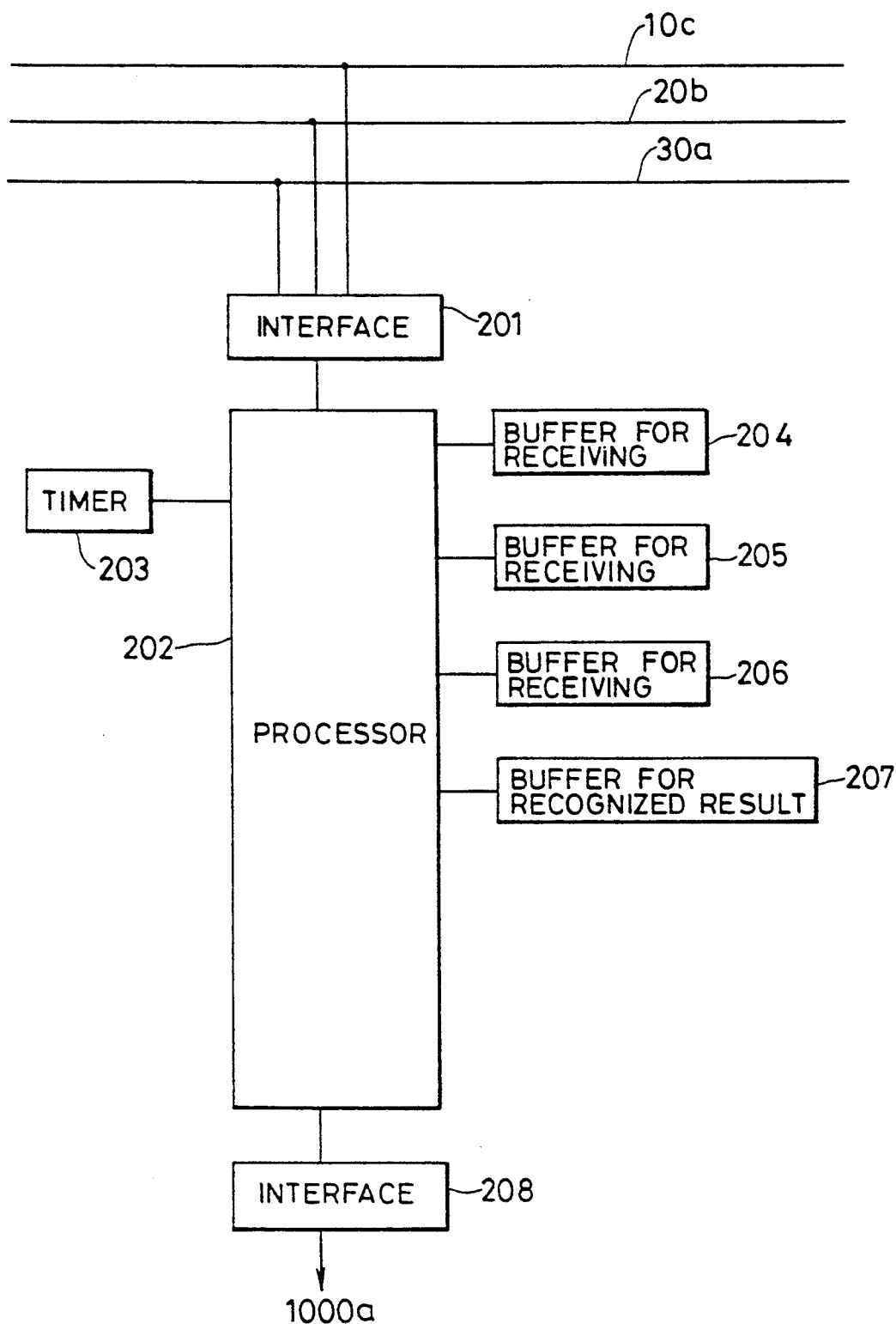
FIG. 4 is a block diagram showing an image recognition processor of FIG. 1 or FIG. 2.

FIG. 4 shows the internal structure of the image recognition processor 200. In the figure, a processor 202 sequentially takes in the data applied from the bus transmission lines 10c, 20b, and 30a by opening and closing an interface 201 cyclically according to a timer 203, and stores them within buffers for receiving 204, 205, and 206 relating to the transmission lines 10c, 20b, and 30a, respectively. The processor 202, then, performs the processing according to the recognition algorithm (this will be described later in detail) on the basis of the stored data, and stores the results of the processing within a buffer for recognized result 207. Further, the processor 202 transmits the data stored within the buffer for recognized result 207 to the image display 1000 through an interface 208. A series of processings mentioned above is executed succesively according to the timer 203.

Figure 5:
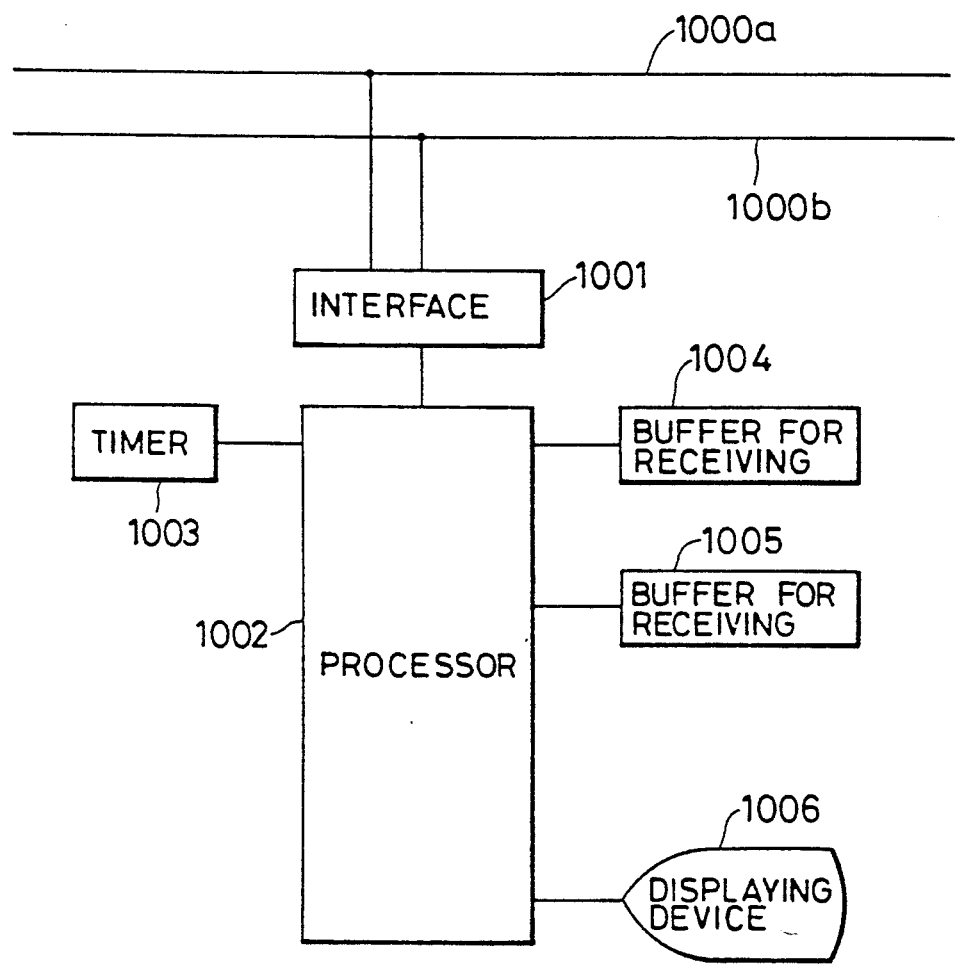
FIG. 5 is a block diagram showing an image display of FIG. 1 or FIG. 2.

FIG. 5 shows the internal structure of the image display 1000, in which a processor 1002 takes in data applied through bus transmission lines 1000a and 1000b by opening and closing an interface 1001 according to a timer 1003, and stores them within buffers for receiving 1004 and 1005 relating to the transmission lines 1000a and 1000b, respectively. The processor 1002, then, displays an image of an object on a displaying device 1006 based upon the data stored within the buffers for receiving 1004 and 1005 according to the display algorithm.

Now, the process of the present invention from the recognition of an object to the display will be described in detail in accordance with FIG. 6.

Figure 6:
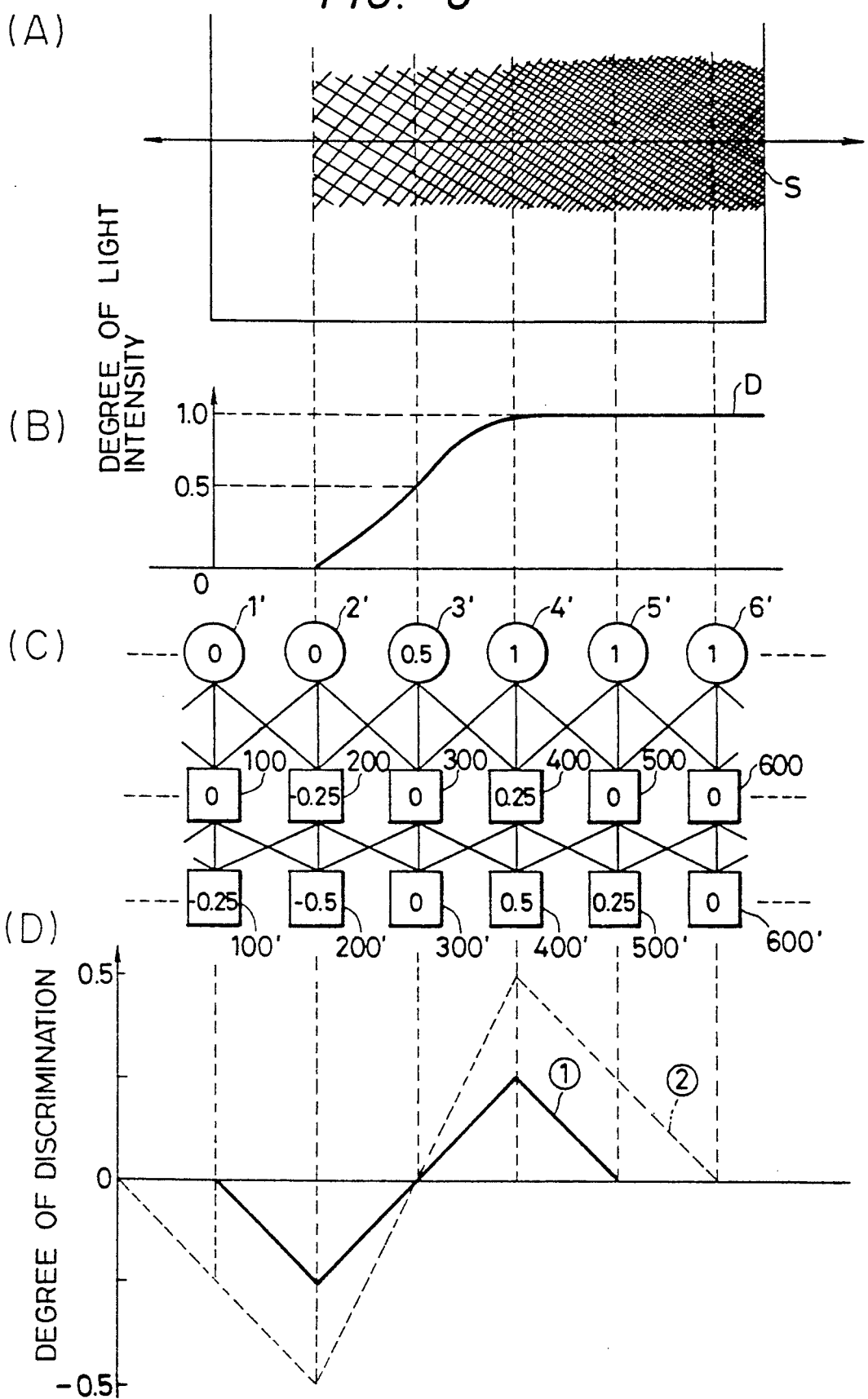
FIGS. 6A-D, 7A-C, 8A-B illustrate the process of the present invention.

Assuming that an object to be recognized S is positioned as shown in FIG. 6 (A), and that the degree of light intensity of the object S is shown by a curve D of FIG. 6 (B). When photo-sensor units 1' through 6' are positioned relating to the object to be recognized S, the photo-sensor units 1' through 6' are illuminated with light reflected from the object to be recognized S, and show values of recognition 0, 0, 0.5, 1, 1, 1, respectively, relating to the degree of light intensity as shown in FIG.6 (C). These values of recognition are applied to the image recognition processors as recognition signals through the interface 10 through 60 shown in FIG. 2.

For example, the image recognition processor 200 of the level 1 receives the recognition signals from the photo-sensor units 1', 2', and 3' through the bus transmission lines 10c, 20b, and 30a. The image recognition processor 300' of the level 2 also receives the recognition signals from the photo-sensor units 1', 3', and 5' through the bus transmission lines 10c, 30b, and 50a. That is, the image recognition processor of the level 1 receives the recognition signals from the one of the photo-sensor units which is positioned facing the processor and the remaining two are positioned on both sides of the one photo-sensor unit. While the image recognition processor of the level 2 receives the recognition signals from the one of the photo-sensor units which is positioned facing the processor and the remaining two are positioned two photo-sensor units to the left and right from the one of the photo-sensor unit facing the processor. Each image recognition processor calculates the degree of discrimination $P_j$ of the object according to the three recognition signals as shown below.

$$P_j = k_1 v_i + k_2 v_j + k_3 v_k \qquad (1)$$

where, $V_i$, $v_j$, and $v_k$ are values of recognition (values of light intensity), and the relationship between them in the image recognition processor of the level 1 is defined as follows, $$v_i = v_{j-1}, \ v_k = v_{j+1}.$$

While the relationship of them in the image recognition processor of the level 2 is as follows, $$v_i = v_{j-2}, \ v_k = v_{j+2}$$

and $k_1$, $k_2$, and $k_3$ are constants.

In the above equation (1), a calculation method which assumes the constants $k_1$, $k_2$, and $k_3$ specifically as $k_1 = -0.5$, $k_2 = 1$, and $k_3 = -0.5$ is regarded as the inhibition method for pattern recognition. On the other hand, a calculation method which assumes them specifically as $k_1 = -1$, $k_2 = 1$, $k_3 = 0$ is regarded as the difference method for pattern recognition. It should be understood, of course, the constants $k_1$, $k_2$, and $k_3$ are not restricted to the above values.

Now, the process of the recognition based upon the inhibition method for pattern recognition will be described hereinafter in accordance with FIG. 6 (C) and (D).

Upon receipt of the values of recognition 0, 0, 0.5, 1, 1, 1 from said photo-sensor units 1' through 6', the image recognition processors 100 through 600 of the level 1 calculate the degree of discrimination, respectively, according to the following equation (2), and obtain values 0, −0.25, 0, 0.25, 0, 0, respectively.

$$P_j = -0.5v_{j-1} + v_j - 0.5v_{j+1} \quad (2)$$

The image recognition processors 100' through 600' of the level 2 calculate degree of discrimination, respectively, according to the following equation (3), and obtain values −0.25, −0.5, 0, 0.5, 0.25, 0, respectively.

$$P_j = -0.5v_{j-2} + v_j - 0.5v_{j+2} \quad (3)$$

FIG. 6 (D) is a graph showing the degree of discrimination calculated by the above image recognition processors. A line ① shows the degree of discrimination calculated by the image recognition processors of the level 1, and a line ② shows the degree of discrimination by the image recognition processors of the level 2. From this graph, it would be understood that the inhibition method for pattern recognition recognizes the object to be recognized S putting emphasis on the profile of the object S. Further, it could also be understood that the profile of the object S discriminated by the image recognition processors of the level 2 is slightly blurred compared with that by the image recognition processors of the level 1.

Figure 7:
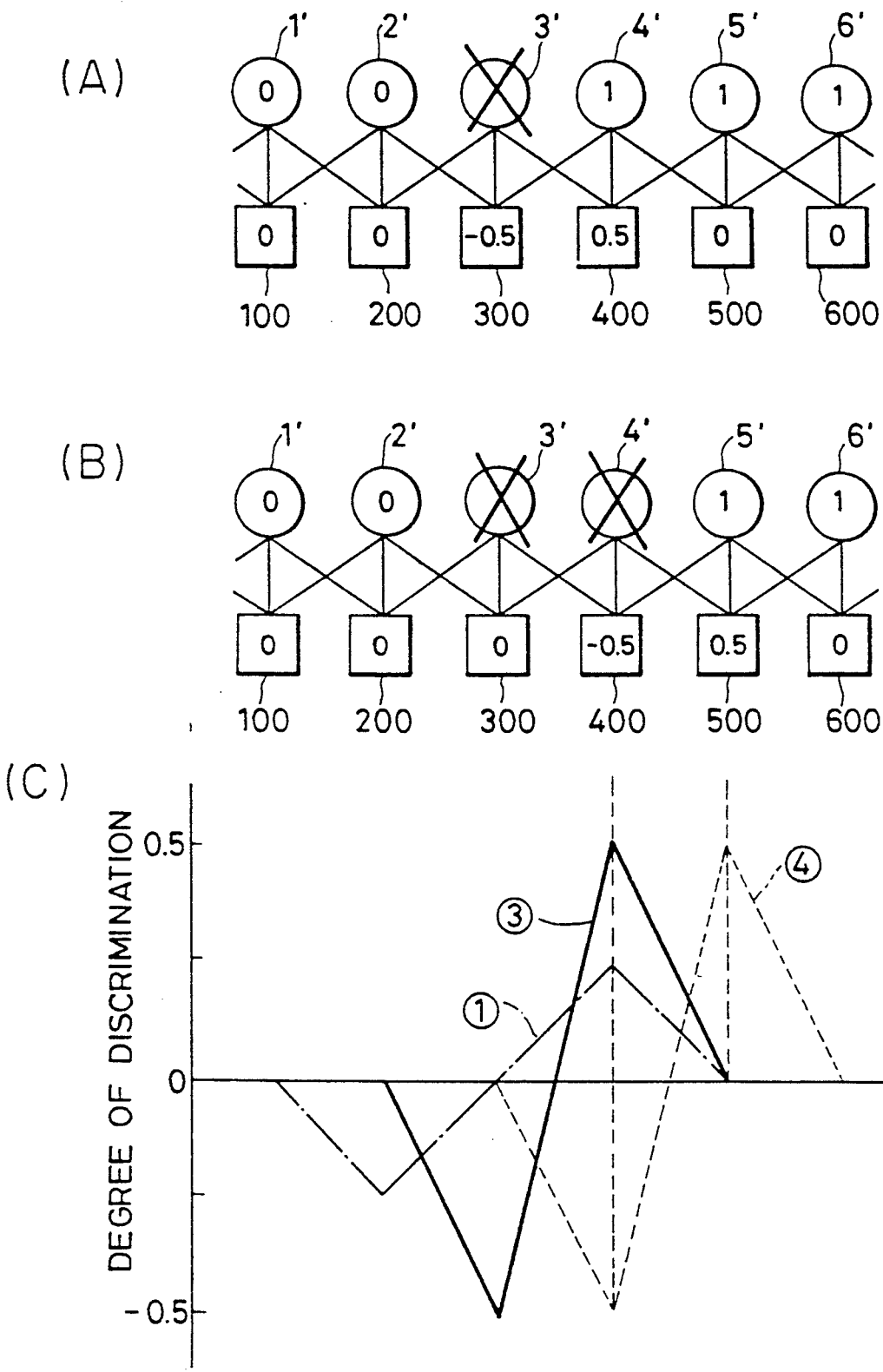

The present object recognition apparatus is provided with the capability at function with failure of the components. The processing for failure occurring in the photo-sensor units will be described in accordance with FIG. 7.

When the photo-sensor unit 3'malfunctions, the image recognition processors 200, 300, and 400 do not receive inputs from the unit 3'. These processors, then, calculate the degree of discrimination based only upon inputs from other photo-sensor units, and obtain 0, −0.5, and 0.5, respectively See FIG. 7 (A). When two adjacent photo-sensor units 3' and 4' malfunction, the image recognition processors 200, 300, 400, and 500 calculate the degree of discrimination based upon other inputs given the absence of inputs from the units 3' and 4', and obtain 0, 0, −0.5, and 0.5, respectively See FIG. 7 (B). A graph of FIG. 7 (C) shows the degree of discrimination, in which a line ① shows the degree of discrimination with no failure in the photo-sensor units (this line is the same as the line ① of FIG. 6 (D), a line ② shows that with the failure of the photo-sensor unit 3', and a line ④ shows that with the failures of the photo-sensor units 3' and 4'. As is apparent from the graph, the profile of the object to be recognized S can be discriminated, thus, the object S can be recognized, even if some failures occur in the photo-sensor units. Upon receipt of no signals from the photo-sensor unit, the image recognition processor detects the failure of the unit and displays an error signal which shows the error state of the photosensor unit on the displaying device.

Figure 8:
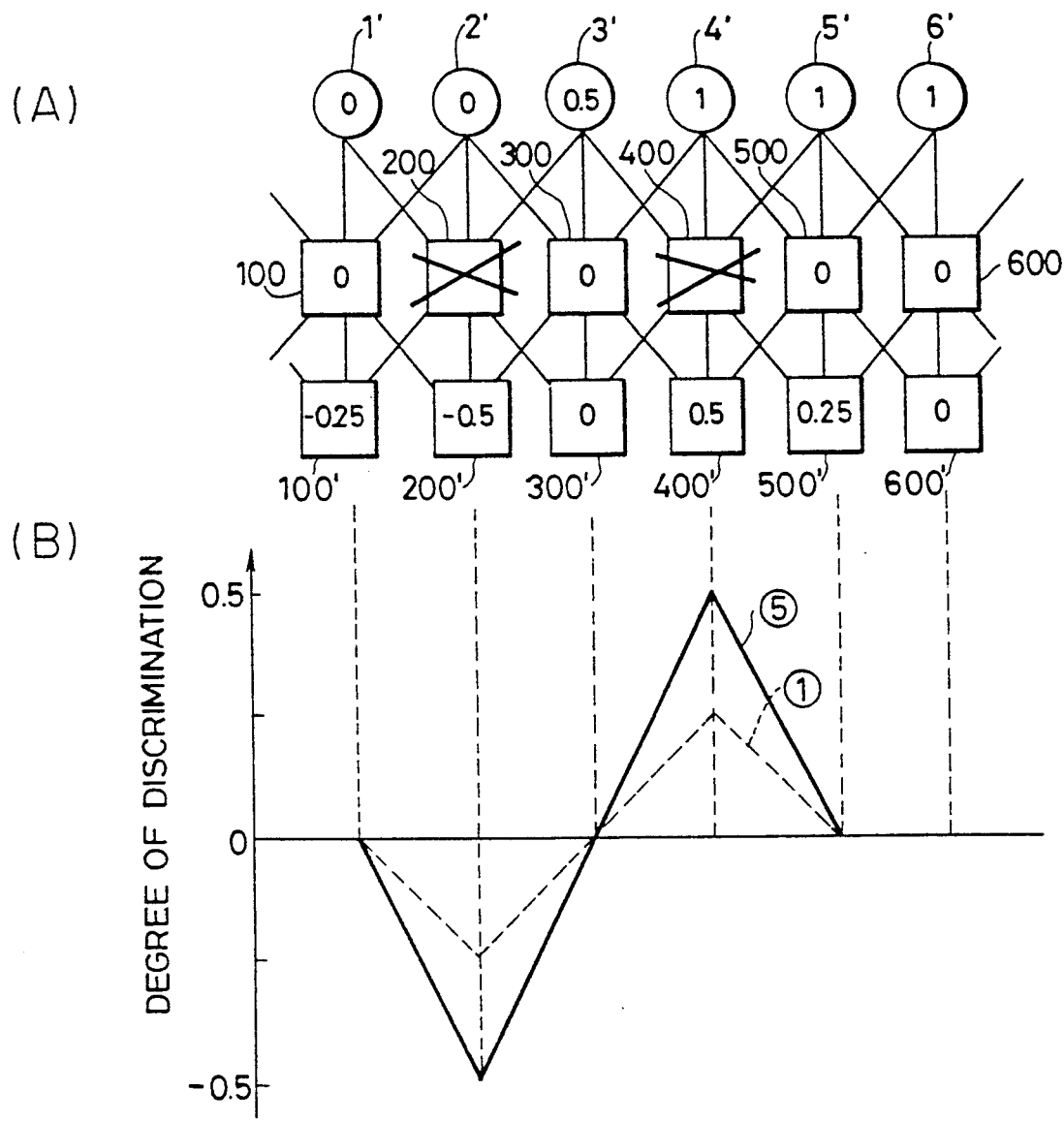

Next, the processing steps when failure occurs in the image recognition processors will be described in accordance with FIG. 8.

When the image recognition processors 200 and 400 of the level 1 malfunctions, the image display 1000 detects these failures as the discrimination data are not applied from the image recognition processors 200 and 400, and displays an error signal on the displaying device 1006. There are two steps to process these failures. The first step improves the discrimination degree data by the image recognition processor 100' through 600' of the level 2, and the second step uses the discrimination degree data by the corresponding image recognition processors 200' and 400' of the level 2 instead of the broken processors 200 and 400 of the level 1. In a graph of FIG. 8 (B), a line 5 shows the degree of discrimination by the second step mentioned above, and a line 1 shows the degree of discrimination with no failure in the image recognition processors 200 and 400 of the level 1 (this is the same as the line 1 of FIG. 6 (D)). It will be apparent from the graph that the profile of the object to be recognized S is discriminated, thus, the object can be recognized, even if some failures take place in the image recognition processors.

It should be understood that the image display 1000 can select an optional discrimination method from various discrimination methods not only in a state of malfunctioning as mentioned above but in a normal state. Further, though the above description is based upon the example in which the photo-sensor units are arranged in a line it should be understood that the present object recognition apparatus is readily applicable to a multidimentional object recognition apparatus by arrangement of the photo-sensor units multidimensionally. Still further, though the above embodiment achieves the object by utilizing the photo-sensor units, it should be understood that the medium of recognition of the object are not restricted to the photo-sensors, and any medium may be used such as rays other than visible rays (infrared rays, ultra-violet rays, etc.), acoustic waves and the like which can recognize the object.

As mentioned above, in an object recognition apparatus utilizing a plurality of sensors, the present embodiment further comprises a plurality of processors connected to said plurality of sensors in network structure, thereby each said sensor recognizes only a part of an object to be recognized and applies recognition signals to related processors among said plurality of processors, and each said processor recognizes the motion of the image of the object to be recognized based only upon said recognition signals applied from a plurality of sensors adjacent to each other. Accordingly, the present object recognition apparatus has the advantages that the object can be recognized at high speed by utilizing a simple algorithm, and that it can function with failures occurring in some of the components such as sensors. Thus, the present invention provides a reliable and inexpensive object recognition apparatus.

Next, an apparatus for making a visible image of an object will be described on the basis of embodiments according to the present invention.

Figure 9:
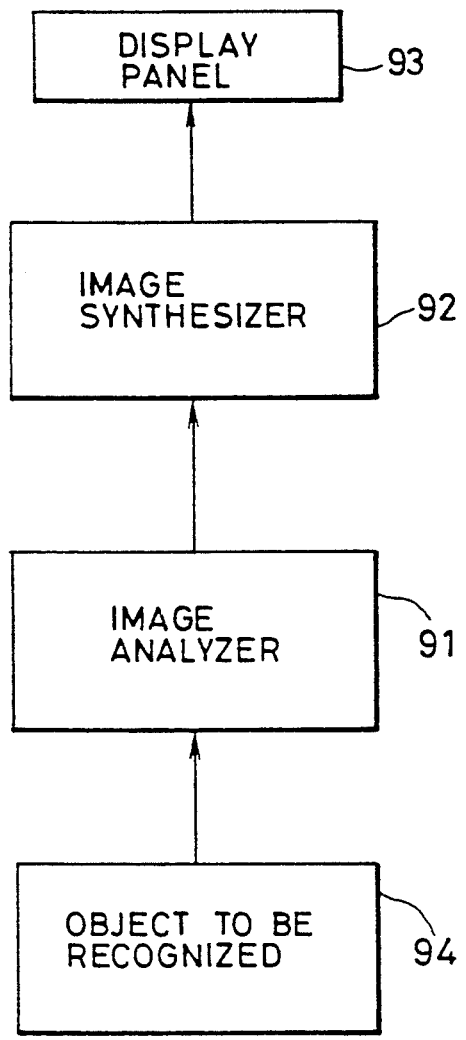
FIG. 9 is a schematic block diagram showing an apparatus which makes a visual image of an object according to the present invention.
Figure 10A:
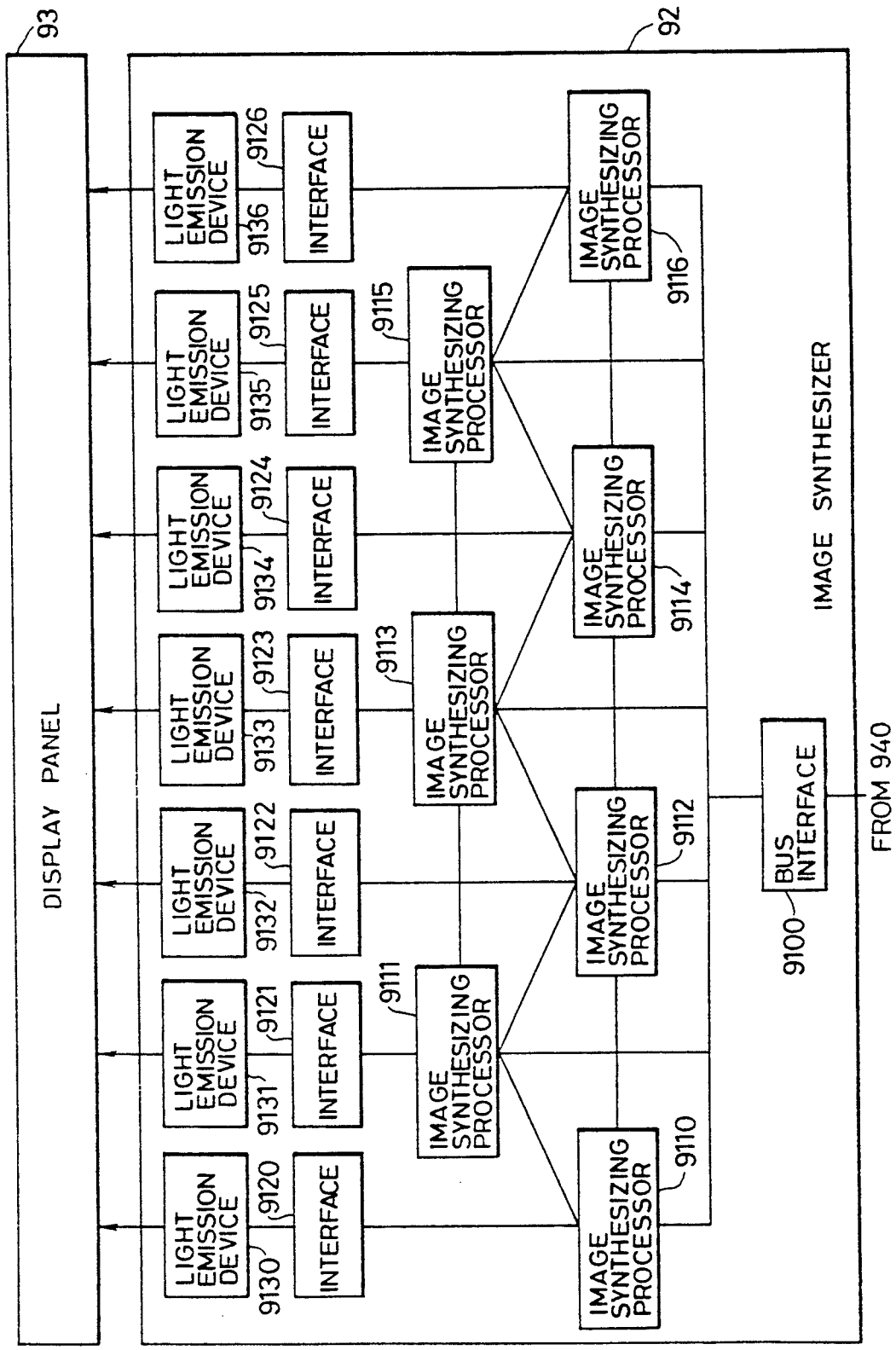
FIGS. 10 A-B shows one embodiment of the apparatus of FIG. 9.
Figure 10B:
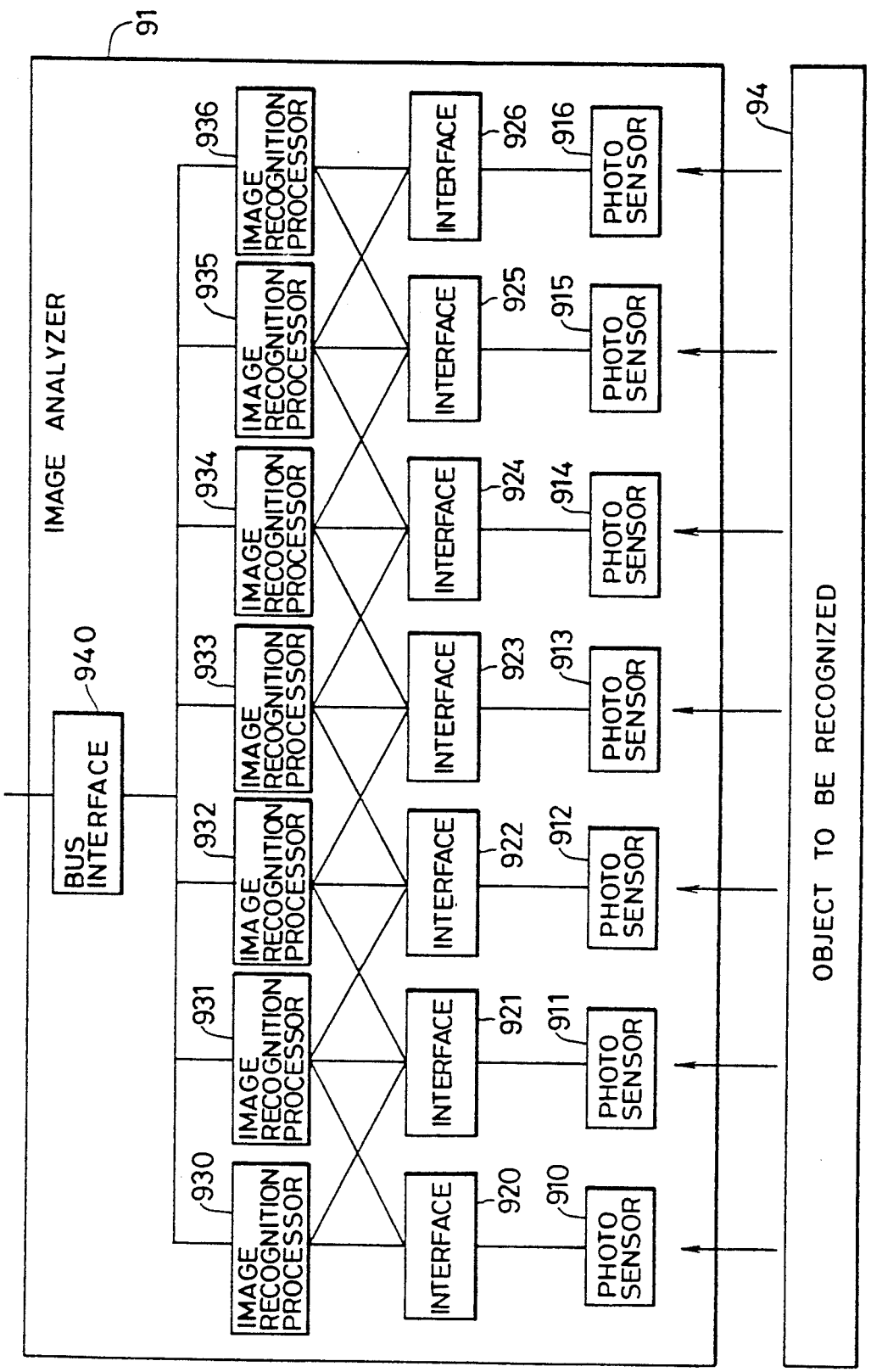

FIG. 9 is a block diagram showing the complete structure of the above mentioned apparatus according to the present invention, and FIG. 10 is a detailed diagram showing the internal structure of the apparatus of FIG. 9.

In FIG. 9, an image of an object to be recognized 94 is displayed on a display panel 93, by, at first, generating profile information by an image analyzer 91, by making the image of the object by an image synthesizer 92 according to said profile information, and by controlling light emitting devices according to the image information made by and applied from the image synthesizer 92.

The image analyzer 91 generates data to be applied to the image synthesizer 92 to make the image of the object, putting emphasis on the profile of the image.

Now, the generating method of the data, in which emphasis is placed upon the profile of the image, by the image analyzer 91 will be described.

Figure 12:
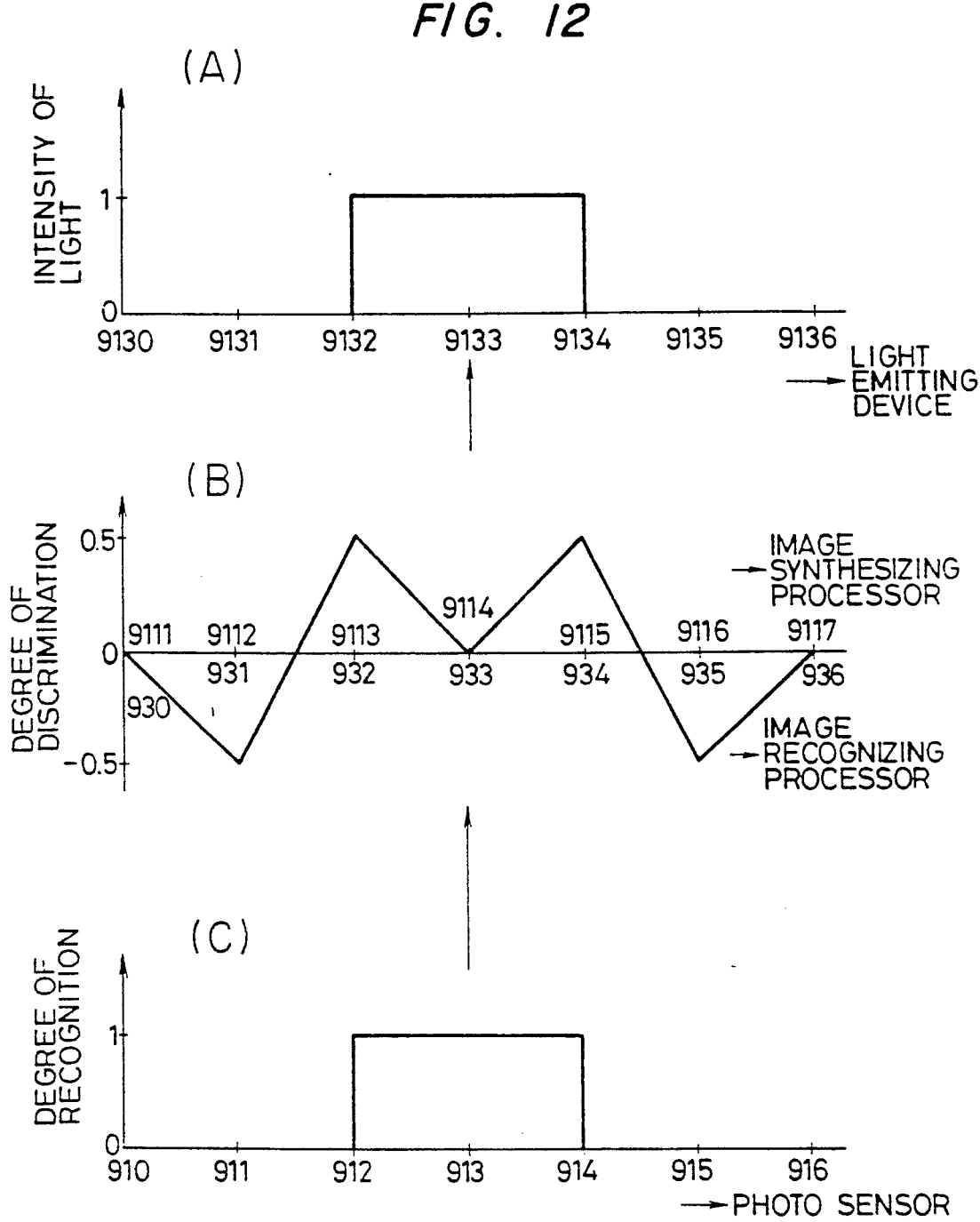
FIGS. 12 A-C, 13A-C, 14A-C, 15A-C, show the operation of the present invention.

In FIG. 10, rays reflected from the object to be recognized 94 are detected by photo-sensors 910 through 916. Assuming that values of recognition (values of light intensity) of detected rays are as follows as shown in FIG. 12 (C):

$$v_{10}=0, v_{11}=0, v_{12}=1, v_{13}=1, v_{14}=1,$$

$$v_{15}=0, v_{16}=0.$$

The photo-sensors 910 through 916 each applies its output to the related one of image recognition processors 930 through 936 and two image recognition processors next to the related one through the related one of interfaces 920 through 926. Each image recognition processor j calculates the degree of discrimination $P_j$ of the object by the following equation (4) according to the values of recognition applied from its own photo-receiving sensor i and two adjacent photo-receiving sensors $i-1$ and $i+1$.

$$P_j = k_1 v_{i-1} + k_2 v_i + k_3 v_{i+1} \tag{4}$$

Assuming that $$k_1 = -0.5, k_2 = 1, \text{ and } k_3 = -0.5,$$

the degree of discrimination $P_j$ is given as follows:

$$P_{30}=0, P_{31}=-0.5, P_{32}=0.5, P_{33}=0,$$

$$P_{34}=0.5, P_{35}=-0.5, P_{36}=0 \tag{5}$$

These values of discrimination are shown in FIG. 12 (b), and it should be understood that the object is discriminated placing emphasis only upon the profile of the object. These outputs $P_{30}$ through $P_{36}$ of the image recognition processors 930 through 939 are applied to the image synthesizer 92 through a bus interface 940 of the image analyzer 91.

The degree of discrimination $P_{30}$ through $P_{36}$ are applied from the image analyzer 91 to image synthesizing processors 9110 through 9116, respectively, through a bus interface 9100.

Applied with the degree of discrimination $P_j$, the image synthesizing processors j calculate values of recognition $v_i$ according to the equation (4). At that time, $P_j$ and $v_i$ must satisfy the following conditions (6).

$$0 \leq P_j \leq 1, 0 \leq v_i \leq 1 \tag{6}$$

But, when calculating $v_i$ from $P_j$ utilizing the equation (4) inversely, the following conditions are given as the initial conditions:

$$v_{-1}=0, v_{-2}=0.$$

The following equation (7) shows the method to obtain the values $v_i$ successively from the smallest i to the biggest.

$$v_{i+1} = \frac{1}{k_3}(P_j - k_1 v_{i-1} - k_2 v_i) \tag{7}$$

Accordingly, it should be understood that, as shown in FIG. 13, in order to obtain the value $v_{i+1}$ it is required to get the values $P_j$ and $v_i$ which are positioned next to the facing position, and the value $v_{i-1}$ which is positioned two position to the left and right from the facing position. That is to say, the value to be obtained $v_i$ is determined according to three values within a function V as shown below:

$$\left. \begin{array}{l} v_{110} = V(P_{30-1}, v_{110-1}, v_{110-2}) \\ v_{111} = V(P_{30}, v_{110}, v_{110-1}) \\ v_{112} = V(P_{31}, v_{111}, v_{110}) \\ v_{113} = V(P_{32}, v_{112}, v_{111}) \\ \cdot \\ \cdot \\ \cdot \\ v_{116} = V(P_{35}, v_{115}, v_{114}) \end{array} \right\} \tag{8}$$

Accordingly, assuming that $$k_1=-0.5, k_2=1, \text{ and } k_3=-0.5 \tag{9}$$

the same manner as mentioned above, the degree of discrimination calculated by the equation (5) should be substituted for the equations (7) and (8).

But at the time, provided that $$P_{30-1}=0 \tag{10}$$

and each value $P_j$ calculated by each image recognition processor 930 through 936 should be applied to each image synthesizing processor 9111 through 9116 which is positioned next to the image synthesizing processor facing each image recognition processor. That is to say, the image synthesizing processors 9111 through are applied with $v_{30}$ through $v_{35}$ as inputs, and the image synthesizing processor 9110 is applied with $P_{30-1}$ as an input.

Accordingly, the input data to the image synthesizing processors are:

$$P_{110} = P_{30-1} = 0$$
$$P_{111} = P_{30} = 0$$
$$P_{112} = P_{31} = -0.5$$
$$P_{113} = P_{32} = 0.5 \quad (11)$$
$$P_{114} = P_{33} = 0$$
$$P_{115} = P_{34} = 0.5$$
$$P_{116} = P_{35} = -0.5$$

Then, the following values are obtained according to the equations (7), (6) and (9) (see FIG. 12 (a)).

$$v_0 = -2\left(P_{110} + \frac{1}{2} v_{-2} - v_{-1}\right) = 0 \quad (12)$$

$$v_1 = -2\left(P_{111} + \frac{1}{2} v_{-1} - v_0\right) = 0 \quad (13)$$

$$v_2 = -2\left(P_{112} + \frac{1}{2} v_0 - v_1\right) = 1 \quad (14)$$

$$v_3 = -2\left(P_{113} + \frac{1}{2} v_1 - v_2\right) = 1 \quad (15)$$

$$v_4 = -2\left(P_{114} + \frac{1}{2} v_2 - v_3\right) = 1 \quad (16)$$

$$v_5 = -2\left(P_{115} + \frac{1}{2} v_3 - v_4\right) = 0 \quad (17)$$

$$v_6 = -2\left(P_{116} + \frac{1}{2} v_4 - v_5\right) = 0 \quad (18)$$

In order to obtain the values of recognition, each image synthesizing processor i is also connected to the image synthesizing processors i−1 and i−2 as shown in FIG. 10.

The values of recognition $v_0$ through $v_6$ which are output results of the image synthesizing processors 9110 through 9116 are applied to the interfaces 9120 through 9126, respectively. The interfaces 9120 through 9126 convert $v_0$ through $v_6$ into electric signals according to their values, and apply a voltage to the light emitting devices 9130 through 9136 to make them emitted light. The image of the object is displayed on the display panel 93 according to the intensity of light emitted from each light emitting device 9130 through 9136. Though the input data to the image synthesizer 92 include only the profile information of the object, the whole image of the object other than the profile is displayed on the display panel 93 based upon the light intensity.

Although the above calculating method of the values of recognition $v_i$ attempts to obtain them in the increasing order of i from the smallest to the biggest, these values can also be obtained in the decreasing order of i from the biggest to the smallest according to the following equation (19).

$$v_{i-1} = \frac{1}{k_1}(P_j - k_2 v_i - k_3 v_{i+1}) \quad (19)$$

Figure 14:
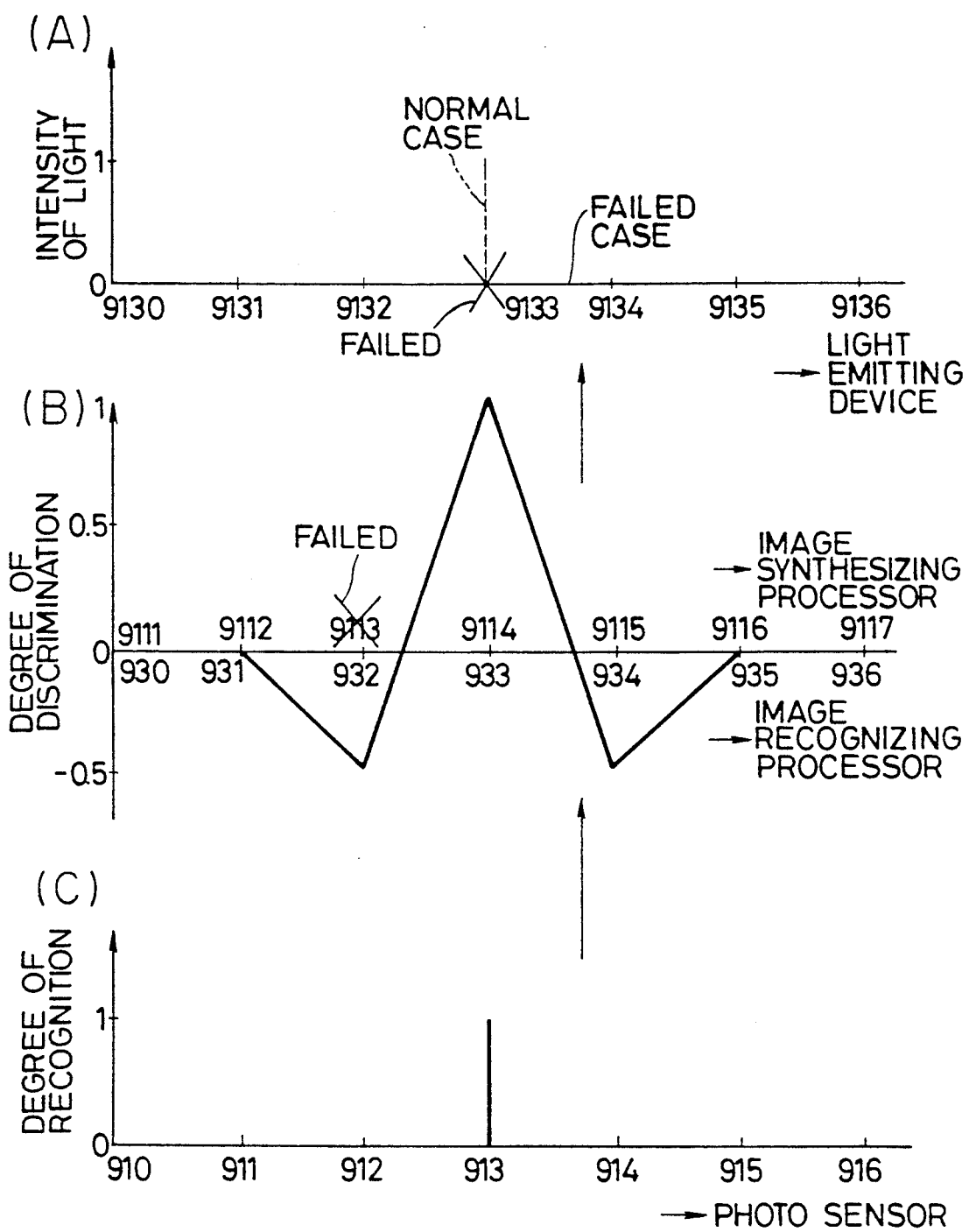

Next, the compensating process will be described for the case when the image synthesizing processor fails, in accordance with the image shown in FIG. 14 (c). FIG. 14 (b) shows the degree of discrimination emphasis on the profile of this object. The following are the input data applied to each image synthesizing processor at that time:

$$P_{110} = P_{30-1} = 0 \quad (20)$$
$$P_{111} = P_{30} = 0 \quad (21)$$
$$P_{112} = P_{31} = 0 \quad (22)$$
$$P_{113} = P_{32} = -0.5 \quad (23)$$
$$P_{114} = P_{33} = 1 \quad (24)$$
$$P_{115} = P_{34} = -0.5 \quad (25)$$
$$P_{116} = P_{35} = 0 \quad (26)$$

When the image synthesizing processor 9113 of FIG. 10 fails as shown by x marks in FIG. 14 (a) and (b), that is to say, when $$v_3 = 0 \quad (27)$$

the values of recognition are obtained as follows according to the equations (12) through (18).

$$v_0 = -2\left(P_{110} + \frac{1}{2} v_{-2} - v_{-1}\right) = 0 \quad (28)$$

$$v_1 = -2\left(P_{111} + \frac{1}{2} v_{-1} - v_0\right) = 0 \quad (29)$$

$$v_2 = -2\left(P_{112} + \frac{1}{2} v_0 - v_1\right) = 0 \quad (30)$$

$$v_3 = 0 \quad (31)$$

$$v_4 = -2\left(P_{114} + \frac{1}{2} v_2 - v_3\right) = -2 \quad (32)$$

In this case, however, the equation (32) does not satisfy the condition $0 \leq v_4 \leq 1$ defined by the equation (6). Accordingly, the image synthesizing processor 9114 does not adopt the image synthesizing method according to the equation (7), and does not apply the value of recognition $v_4$ to the image synthesizing processors 9115 and 9116.

On the other hand, after receiving the values of recognition as an input, each image synthesizing processor may select the alternative image synthesizing method according to the equation (19) other than that based upon the equation (7).

Now, the alternative image synthesizing method will be described in accordance with the equation (19). In this case, the bus interface 9100 distributes the input data from the image analyzer 91 to each image synthesizing processor as data for the equation (19). The following input data are applied to the image synthesizing processors 9116 through 9110 at that time:

$$P_{116} = P_{36+1} = 0 \quad (33)$$

$$P_{115} = P_{36} = 0 \quad (34)$$

$$P_{114} = P_{35} = 0 \quad (35)$$

$$P_{113} = P_{34} = -0.5 \quad (36)$$

$$P_{112} = P_{33} = 1 \quad (37)$$

$$P_{111} = P_{32} = -0.5 \quad (38)$$

$$P_{110} = P_{31} = 0 \quad (39)$$

Applied with these data, the image synthesizing processors calculate the values of recognition according to the equation (19) with the initial values:

$$v_7 = 0, v_8 = 0 \quad (40)$$

and as the image synthesizing processor 9113 is out of order, $$v_3 \equiv 0 \quad (41)$$

The values of recognition calculated by the image synthesizing processors are:

$$v_6 = -2\left(P_{116} - v_7 + \frac{1}{2} v_8\right) = 0 \quad (42)$$

$$v_5 = -2\left(P_{115} - v_6 + \frac{1}{2} v_7\right) = 0 \quad (43)$$

$$v_4 = -2\left(P_{114} - v_5 + \frac{1}{2} v_6\right) = 0 \quad (44)$$

$$v_3 = 0 \quad (45)$$

$$v_2 = -2\left(P_{112} - v_3 + \frac{1}{2} v_4\right) = -2 \quad (46)$$

Among them, the value of recognition calculated by the equation (46) does not satisfy the condition $0 \leq v_2 \leq 1$ defined by the equation (6). In the same manner as mentioned above, the image synthesizing processor 9112 detects the error, rejects the image synthesizing method according to the equation (19), and stops to apply the value $v_2$ to the image synthesizing processors 9111 and 9110.

Thus, among the above mentioned results of the equations (28) through (32) and (42) through (46), the image synthesizing processors 9110 through 9112 adopt the values calculated by the equations (28) through (30), and the image synthesizing processors 9116 through 9114 adopt the values calculated by the equations (42) and (43), so as to control the light emitting devices 9130 through 9136.

Figure 15:
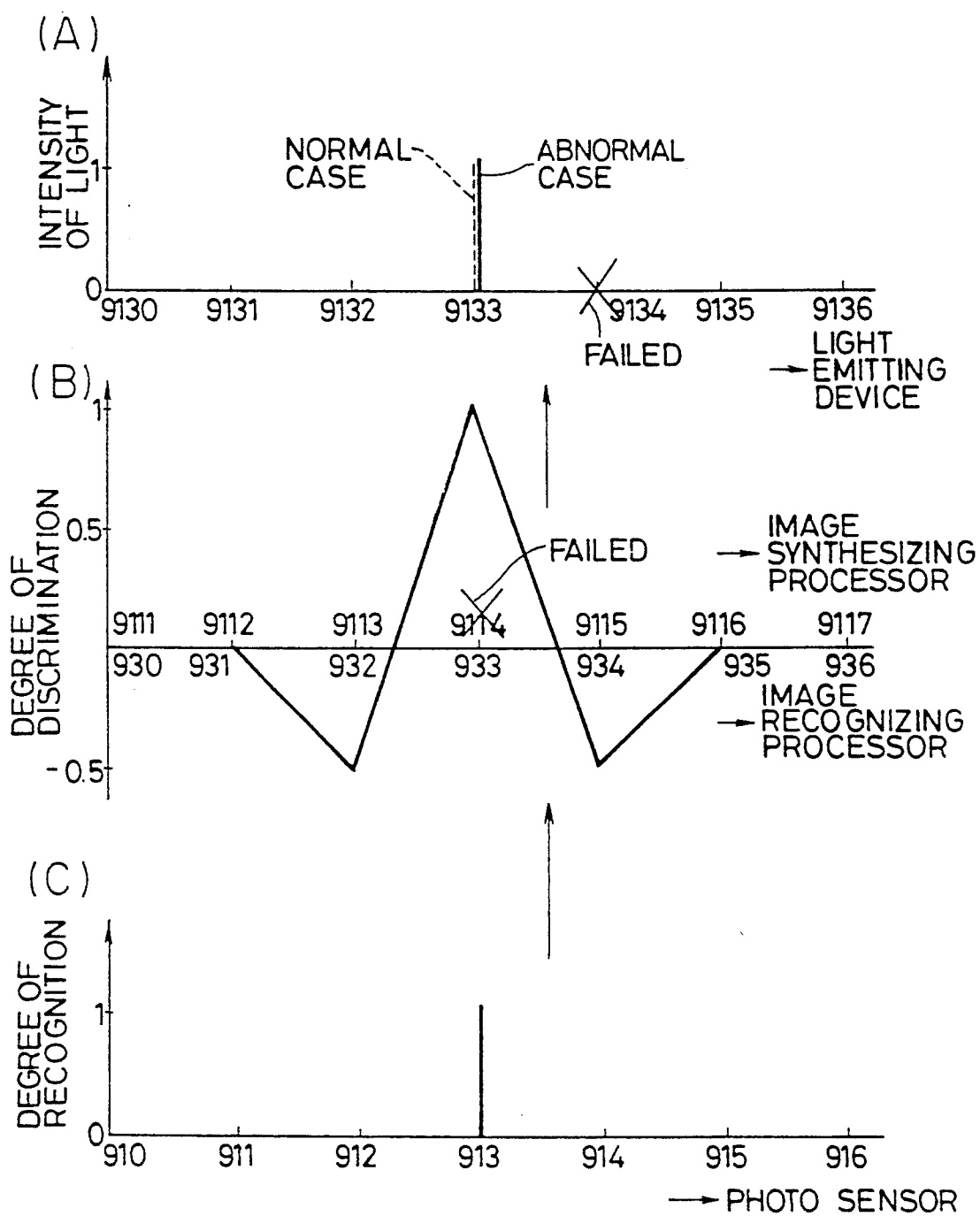

Next, FIG. 15 shows the case when the image synthesizing processor 9114 fails. Also in this case, the normal image can be displayed on the display panel by the same image synthesizing method as mentioned above.

Accordingly, it should be understood that, even when one of the image synthesizing processors fails, other image synthesizing processors can continue their processings without halting.

In order to increase the processing rate, each image synthesizing processor may select either the image synthesizing method by the equation (7) or that by the equation (19) on receipt of the data necessary for the processing.

Figure 11:
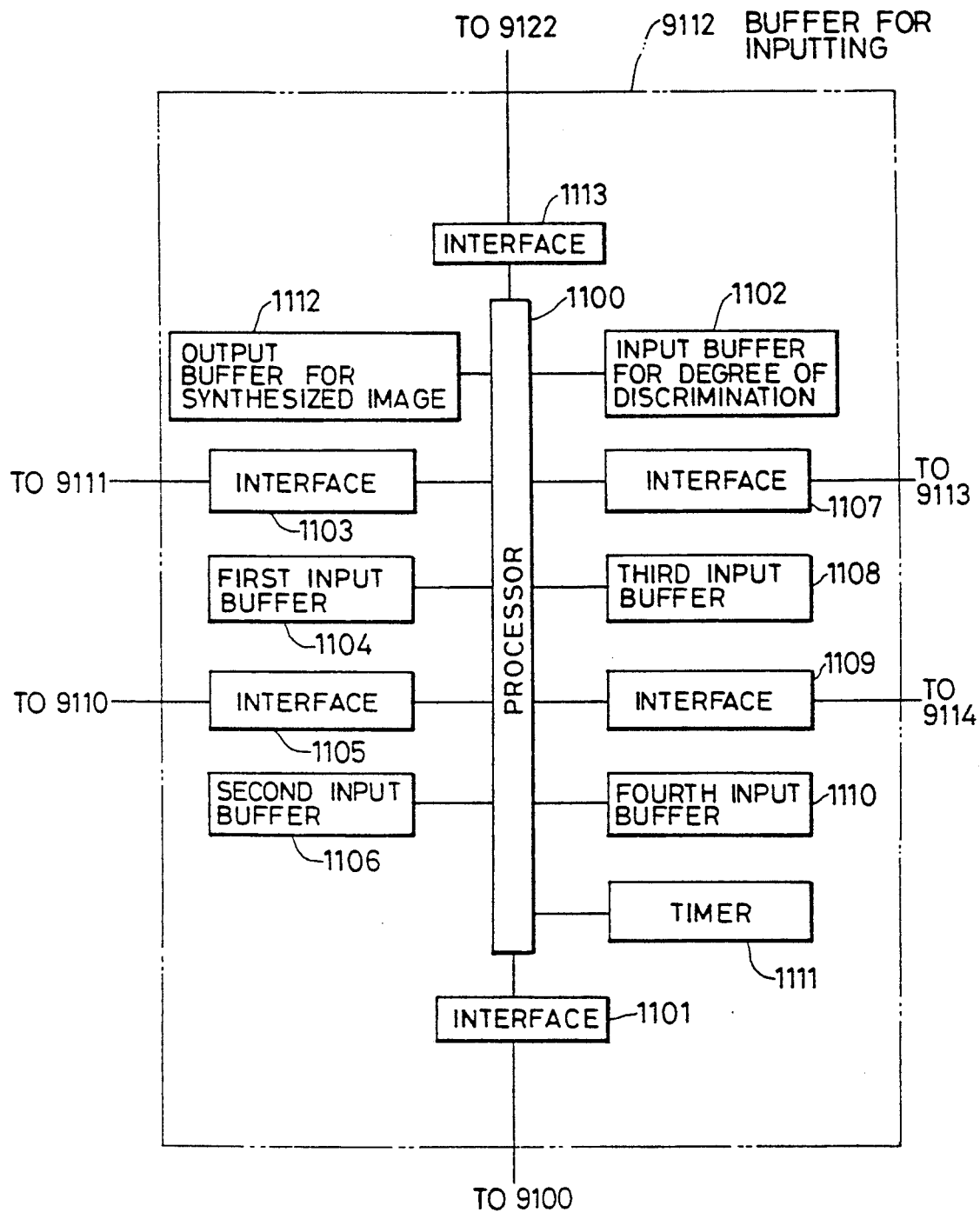
FIG. 11 shows one embodiment of an image synthesizing processor of FIG. 10.

Now, the above internal operation within the image synthesizing processors will be described in accordance with FIG. 11. Since all image synthesizing processors of the present invention have the identical internal structure, the following description will be based upon the image synthesizing processor 9112 only.

The image synthesizing processor 9112 is applied with the degree of discrimination $P_{31}$ and $P_{33}$ as inputs through an interface 1101. These inputs, which are the data necessary for the synthesizing method based upon the equation (7) or (19), are then stored within an input buffer for discrimination degree 1102. At the time when these data are stored, a timer 1111 is initialized and set to $T_0$. Simultaneously, both image synthesizing processors 9110 and 9116 adjacent to the image synthesizer 92 start processing utilizing algorithm of the equations (7) and (19), respectively. Other image synthesizing processors start to synthesize the image after received predetermined values of recognition from the image synthesizing processors connected thereto. Upon receipt of the values of recognition from the image synthesizing processors 9110 and 9111, or 9113 and 9114 which are connected thereto, a processor 1100 stores them within a first input buffer through a fourth input buffer 1104, 1106, 1108, and 1110, and sets the timer 1111 according to each buffer to $T_1$, $T_2$, $T_3$, and $T_4$. When the values of recognition are stored within both first and second input buffers 1104 and 1106, the processor 1100 calculates the values of recognition utilizing the equation (7), and stores the results of the calculation within an output buffer for synthesized image 1112. The processor 1100 also applies the results of the calculation to the image synthesizing processors 9113 and 9114 through interfaces 1107 and 1109, and further to the light emitting devices through the interface 1113. The processor 1100, then, resets the timer $T_0$, $T_1$, and $T_2$. On the contrary when the values of recognition are applied from the image synthesizing processors 9113 and 9114, the processor 1100 calculates the values of recognition according to the equation (19), and applies the results of the calculation to the image synthesizing processors 9110 and 9111 in the opposite direction to the above. The processor 1100, then, resets the timer $T_3$ and $T_4$, and clears an input buffer for discrimination degree 1102. These results of the calculation are compared with the values of recognition which have stored within the output buffer for synthesized image 1112, respectively. If these values differ from each other, the processor 1100 regards this state as an error and stops both the processing after that and the control of the light emitting devices.

When at least one of the values $T_1$ through $T_4$ of the timer 1111 exceed the predetermined value, the processor 1100 regards the situation as the failure of either one of said two pairs of the image synthesizing processors 9110 and 9111, or 9113 and 9114 according to the exceeded value of the timer. The processor 1100 resets the pair of values of the timer ($T_1$ and $T_2$) or ($T_3$ and $T_4$), and clears the input buffer for discrimination degree 1102. Further, when the image synthesizing processor does not output the values of recognition in spite that the time $T_0$ exceeds the predetermined value, the processor 1100 also regards it as an error, and resets the value of the timer $T_1$ and clears the contents of the input buffer for discrimination degree 1102.

Further, when new data are applied from the image analyzer 91, the processor 1100 performs the same processing as described above. At that time, the existing data within the output buffer for synthesized image 1112 are erased so that the new values of recognition may be written in.

Figure 16:
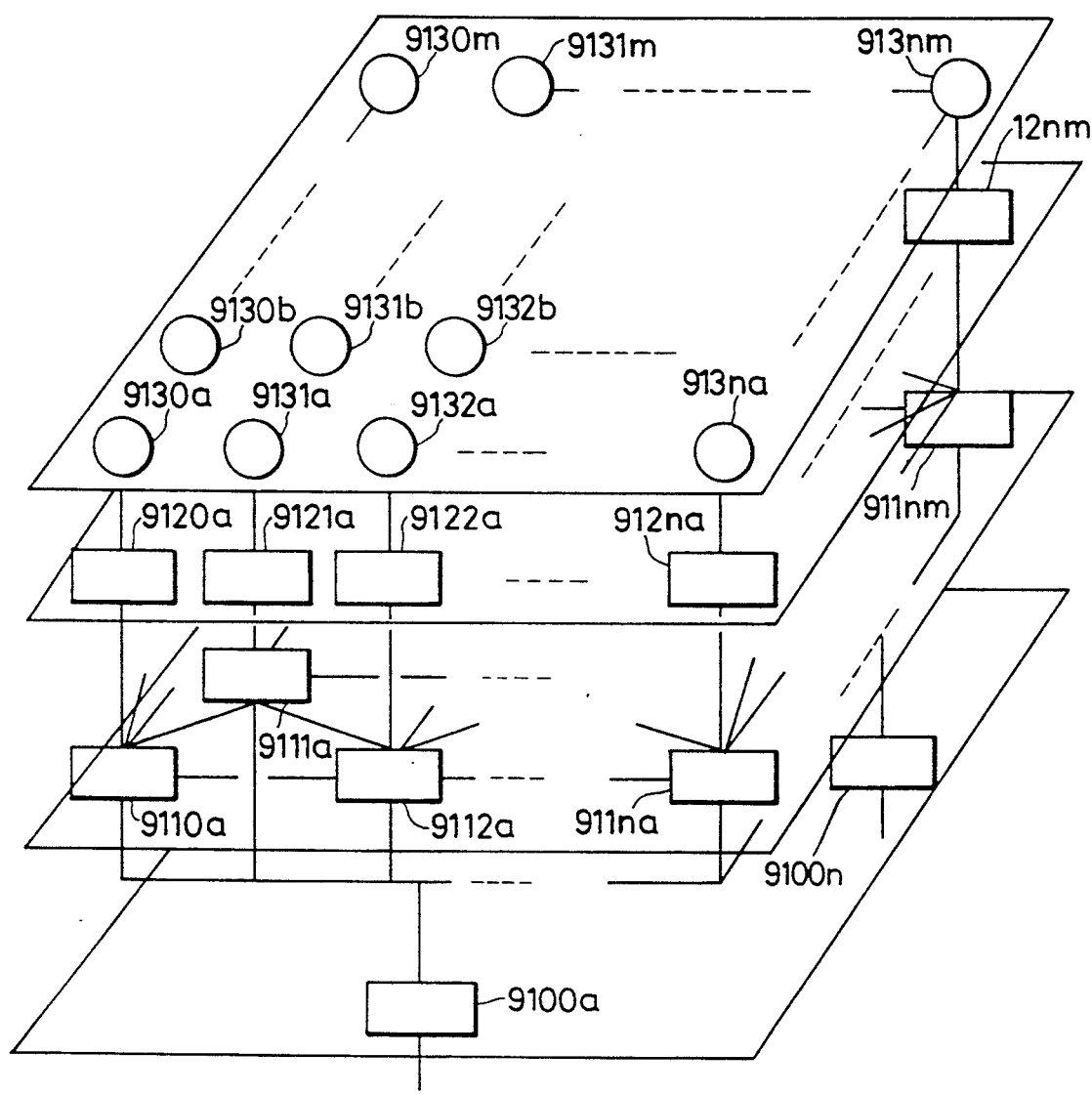
FIG. 16 shows another embodiment of the apparatus which makes a visual image of an object according to the present invention.

Although the light emitting devices are arranged in a line in the embodiment described above, the light emitting devices of the present invention may be arranged in two dimensions. FIG. 16 shows another embodiment in which the light emitting devices are arranged in two dimensions. In this embodiment, bus interfaces 9100a through 9100m and 9200a through 9100n, image synthesizing processors 9110a through 9100m and 9110a through 911na, interfaces 9120a through 9120m through 9120m and 9230a through 912na, light emitting devices 9130a through 9130m and 9130a through 913na are also arranged in two dimensions. Differing from the unidimensional arrangement, each image synthesizing processor is connected to eight image synthesizing processors adjacent thereto. The image synthesizing method in each axial direction, however, is identical to that of the unidimensional arrangement, and there are two algorithms in each axial direction relating to the equations (7) and (19).

In order to decrease the amount of data to be transmitted, the image analyzer is allowed not to transmit the degree "0" of discrimination to the image synthesizer. In this case, the processor 1100 assumes the degree of discrimination as "0" so long as the predetermined data are stored within the first through the fourth input buffers 1104, 1106, 1108, and 1110, even if the input buffer for discrimination degree 1102 stores no data.

Further, when the image is displayed utilizing each light emitting device at the same time, it is not required for the processor 1100 to control the light emitting devices at the time when it derivates the values of recognition, but it may control the light emitting devices only when the instruction is applied from the image analyzer.

As the input data applied to the image synthesizer include the information not showing the image itself but placing emphasis upon the profile of the image, the present apparatus can synthesize the image of the object even if some parts of the input data are not applied to the image synthesizer.

As mentioned above, the present embodiments comprise a plurality of identical processors, such as microcomputers, arranged in network structure, and a plurality of light emitting devices connected to said processors. Accordingly, it should be understood that the present invention provides an excellent and reliable image displaying device which can display an image of a single dimension or a two dimensional object readily at high speed. Further, the present invention provides an inexpensive image displaying device by utilizing inexpensive processors. Still further, the present invention requires only the profile information of an object as input data, so that the amount of the data can be decreased. Still further, the present invention can display an image of an object even when some of processors fail, without halting the whole system.

From the foregoing, it will now be apparent that a new and improved image processing apparatus has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An image processing system comprising:
    inputting means for supplying input signals from respective ones of a plurality of sources of object data, each input signal representing a respective feature of an image of an object;
    a plurality of processing means connected with said inputting means for receiving the input signals, each processing means including a programmable processor connected to receive plural input signals for producing an output signal corresponding to a partial image of the object by performing a predetermined processing which is a function of said plural input signals and at least one quantity which is selectable in accordance with a desired image processing; and
    a plurality of outputting means connected with the plurality of processing means for outputting partial images in response to the output signal produced by said processing means.

2. An image processing system according to claim 1 wherein:
    each of said outputting means comprise a light emission device.

3. An image processing system according to claim 1 wherein:
    said partial images comprise profile information of the object.

4. An image processing system according to claim 1 wherein:
    said outputting means are arranged in two dimensions.

5. An image processing system comprising:
    a plurality of detecting means for detecting an image of an object, each detecting means producing an output signal which represents part of said image; and
    a plurality of processing means, each processing means including a programmable processor coupled to a different combination of output signals from a plurality of said detecting means for processing said combination of output signals in accordance with a predetermined processing which is a function of said output signals and at least one quantity which is selectable in accordance with a desired image processing.

6. An image processing system according to claim 5 wherein:
    said predetermined calculation is changeable in response to a predetermined state.

7. A signal processing system comprising:
    detecting means for detecting portions of an image and producing signals each corresponding to respective portions of the image;
    a plurality of processing means, each processing means including a first interface for receiving a combination of the signals corresponding to respective portions of the image from said detecting means, a receiving buffer for storing said combination of signals from said first interface means, a programmable processor connected to receive said combination of signals from said first interface means for performing a predetermined processing which is a function of said combination of signals and at least one quantity which is selectable in accordance with a desired image processing, a result buffer for storing a result of the predetermined processing produced by the processor and a second interface for transmitting the stored processing result; and output means for outputting the processing result transmitted through said second interface.

8. A signal processing system comprising:

a plurality of input devices for inputting respective signals;

a plurality of processing means, each processing means including a first interface for receiving a combination of the respective signals from a plurality of said input devices, an input buffer for storing data corresponding to said combination of signals from said first interface, a programmable processor connected to receive said combination of signals from said first interface for performing a predetermined processing which is a function of the respective signals and at least one quantity which is selectable in accordance with a desired image processing, a result buffer for storing a result of the predetermined processing and a second interface for transmitting the stored processing result; and an output device for outputting the processing result transmitted through said second interface as data corresponding to said signals, wherein at least one of the input devices is coupled to supply an output in common to at least two processors.

9. A signal processing system comprising:

a plurality of input devices for inputting respective signals;

a plurality of processing devices, each processing device including a programmable processor coupled to a combination of said input devices to receive respective signals from said combination of input devices for performing a predetermined processing which is a function of the respective signals and at least one quantity which is selectable in accordance with a desired image processing; and an output device for outputting a processing result of the predetermined processing as data corresponding to said signals, wherein at least one of the input devices is coupled to supply an output in common to at least two processors.

10. A signal processing system comprising:

a plurality of input devices for inputting respective signals;

a plurality of processing devices, each processing device including a first interface for receiving a combination of the signals from a plurality of said input devices, a receiving buffer for storing said combination of signals from said first interface, a programmable processor connected to receive said combination of signals from said first interface for performing a predetermined processing which is a function of the respective signals and at least one quantity which is selectable in accordance with a desired image processing, a result buffer for storing a result of the predetermined processing and a second interface for transmitting the stored processing result, wherein at least one of said input devices is connected to supply an output in common to at least two of said processors for supplying a signal in common to the first interfaces therein; and an output circuit for outputting the processing result transmitted through said second interface as data corresponding to said signals.

11. A signal processing system comprising:

a plurality of input devices for inputting respective signals;

a plurality of programmable processors, each processor being coupled to a combination of the input devices to receive the respective signals from a plurality of said input devices for performing a predetermined processing which is a function of said signals and at least one quantity which is selectable in accordance with a desired image processing, wherein at least one of said input devices is connected to at least two of said processors for supplying a signal in common to the two processors; and an output circuit for outputting the processing result as data representing features of the input signals.

12. A signal processing system comprising:

an input device for inputting data which includes a plurality of data portions;

a plurality of programmable processors, each processor being connected to receive data representing a combination of data portions for producing a signal by performing a predetermined processing which is a function of the combination of data portions and at least one quantity which is selectable in accordance with a desired image processing;

a plurality of output devices connected to said plurality of processors for outputting data corresponding to said signals produced by said processors; and wherein at least one of said processors is connected to receive a combination of signals from at least two of said processors.

13. An image processing system comprising:

(a) a plurality of detecting means for detecting an image of an object to be recognized with each detecting means producing an output signal which is a function of at least part of said image;

(b) a plurality of first processing means, each processing means including a programmable processor corresponding to a different one of the plurality of detecting means and being responsive to a different combination of output signals including output signals from the corresponding detecting means and at least one detecting means adjacent thereto, each of said first processing means being operationally independent and detecting a first level of degree of discrimination of a part of the image; and (c) a plurality of second processing means, each including a programmable processor responsive to a different combination of output signals from processors in said first processing means for detecting a second level of degree of discrimination of a part of said image.

14. An image processing system in accordance with claim 13, wherein each of said first and second processing means performs a plurality of operations with one of the operations being selected on the basis of a detected one of the first and second levels of degree of discrimination.

15. An image processing system in accordance with claim 14, wherein the detecting of each of the first and second levels of degree of discrimination of the image by said first and second processing means is carried out in accordance with a predetermined rule for recognition which is a synthesis of at least one output signal.

16. An image processing system in accordance with claim 14, wherein the detecting of each of the first and second levels of degree of discrimination of the image by said first and second processing means is carried out in accordance with a predetermined rule for recognition which is a predetermined equation for processing at least one output signal.

17. An image processing system in accordance with claim 14, wherein the detecting of each of the first and second levels of degree of discrimination by said first and second processing means is based upon a predetermined condition.

18. An image processing system in accordance with claim 14, wherein when one or more of the detecting means has failed, said first and second processing means is responsive to an indication from the one or more failed detecting means for processing signals from other detecting means which have not failed.

19. An image processing system in accordance with claim 13, wherein the detecting of each of the first and second levels of degree of discrimination of the image by said first and second processing means is carried out in accordance with a predetermined rule for recognition which is a synthesis of at least one output signal.

20. An image processing system in accordance with claim 13, wherein the detecting of each of the first and second levels of degree of discrimination of the image by said first and second processing means is carried out in accordance with a predetermined rule for recognition which is a predetermined equation for processing at least one output signal.

21. An image processing system in accordance with claim 13, wherein the detecting of each of the first and second levels of degree of discrimination by said first and second processing means is based upon a predetermined condition.

22. An image processing system in accordance with claim 13, wherein each of said plurality of processing means includes means for performing a synthesis process involving a result of the detecting of a level of a degree of discrimination of said image.

23. An image processing system in accordance with claim 22, wherein when one or more of said processing means has failed in recognizing the object, a processing means which has not failed performs said synthesis process receiving a result of detecting a level of degree of discrimination of each received output signal in accordance with a predetermined rule for recognizing the object.

24. An image processing system in accordance with claim 13, wherein when one or more of the detecting means has failed, said first and second processing means is responsive to an indication from the one or more failed detecting means for processing signals from other detecting means which have not failed.

25. An image processing system in accordance with claim 13, wherein the detecting of a level of degree of discrimination of said image by said first and second processing means is carried out in accordance with a predetermined rule for recognition of the object which generates profile information of the object.

26. An image processing system in accordance with claim 13, wherein the detecting of the first and second levels of degree of discrimination by said first and second processing means is a determination of a degree of recognition.

27. An image processing system in accordance with claim 13, wherein each of the processors in said first and second processing means includes means for performing a predetermined processing which is a function of a combination of said output signals and at least one quantity which is selectable in accordance with a desired image processing.

* * * * *